US006574284B1

(12) United States Patent
Jordan

(10) Patent No.: US 6,574,284 B1
(45) Date of Patent: Jun. 3, 2003

(54) BIT ENCODING SYSTEM AND METHOD

(75) Inventor: Mark John Jordan, Larkhall (GB)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/496,325

(22) Filed: Feb. 2, 2000

(30) Foreign Application Priority Data

Mar. 20, 1999 (GB) ............................................. 9906386

(51) Int. Cl.[7] .............................................. H03C 5/00
(52) U.S. Cl. ..................................... 375/268; 327/141
(58) Field of Search ................................ 375/257, 268, 375/269, 300, 320, 356, 357; 370/503, 514; 332/149, 141

(56) References Cited

U.S. PATENT DOCUMENTS 4,731,798 A    3/1988  Dirr ............................ 375/38
5,644,600 A *  7/1997  Kawai ......................... 375/286
5,675,609 A   10/1997  Johnson ....................... 375/237

FOREIGN PATENT DOCUMENTS

GB        2259632 A        3/1993

OTHER PUBLICATIONS

UK Search Report (1 pg.).

* cited by examiner

Primary Examiner—Don N. Vo
Assistant Examiner—Qutub Ghulamali

(57) ABSTRACT

A bit encoding system for use with a bus (7) of a distributed microcontroller network (200,300), includes a waveform generator (100) for generating a substantially sinusoidal waveform. A modulation arrangement (340, 341) is arranged to amplitude modulate the waveform between first and second amplitudes to define first and second data values. A zero crossing point of the waveform is used to define timing information for the bus (7).

10 Claims, 1 Drawing Sheet

BIT ENCODING SYSTEM AND METHOD

FIELD OF THE INVENTION

This invention relates to bit encoding methods for microcontroller based distributed systems, and particularly but not exclusively to such methods which require time synchronisation without a bus master controller.

BACKGROUND OF THE INVENTION

Several bit encoding methods are known which facilitate serial communications protocols for data traffic on distributed microcontroller systems, where there is no bus master controller. These typically seek the best compromise between synchronisation (to ensure fault free data transmission), effective use of available bandwidth and lowest possible Electro-Magnetic Interference (EMI) emissions.

For example, a transmitting microcontroller node using the Controller Area Network (CAN) protocol ensures that synchronisation across a network is maintained by 'stuffing' extra bits into a message after five consecutive high or low bits have been transmitted. The stuffed bit is of the opposite polarity to the five previous bits and the receiver is able to synchronise to the extra edge or edges in the message. Thus, synchronisation is achieved at the cost of loss of bandwidth and a small increase in EMI emissions.

Another example, which employs Manchester encoding, divides each bit time into two parts, one clock and one data. In this case, synchronisation is maintained and EMI emissions are kept satisfactory by the encoding, which produces an average edge per bit count of approximately 0.75, but at the expense of bandwidth which is effectively halved.

Therefore what is needed is a new bit encoding method for serial communication which overcomes the problems of synchronisation within a distributed system architecture and EMI emissions, while utilising bandwidth to the full.

This invention seeks to provide a bit-encoding system and method which mitigate the above mentioned disadvantages.

SUMMARY OF THE INVENTION

According to a first aspect of the present invention there is provided a bit encoding system for use with a bus of a distributed microcontroller network, comprising a first substantially sinusoidal waveform which is amplitude modulated between first and second amplitudes to define first and second data values, and which has a predetermined periodic parameter for defining timing information for the bus.

According to a second aspect of the present invention there is provided a bit encoding method for bit encoding a bus of a distributed microcontroller network, the method comprising: amplitude modulating a first substantially sinusoidal waveform between first and second amplitudes to define first and second data values; and, using a predetermined periodic parameter for defining timing information for the bus.

Preferably the amplitude modulation is selectively switched between the first and second amplitudes substantially at the occurrence of the periodic parameter. The predetermined periodic parameter is preferably a zero crossing point of the first sinusoidal waveform. Preferably the predetermined periodic parameter is the negative to positive zero crossing point of the sinusoidal waveform.

The system or method preferably further comprises a second substantially sinusoidal waveform provided for a second bus, the further waveform being amplitude modulated in antiphase to the first waveform, and having a predetermined periodic parameter for defining timing information for the second bus.

Preferably the predetermined periodic parameter of the second wavelength is phase shifted by a half wavelength from the predetermined periodic parameter of the first wavelength.

In this way a new bit encoding system and method for serial communication are provided which overcome the problems of achieving synchronisation while maintaining low EMI emissions and exhibiting efficient use of bandwidth.

BRIEF DESCRIPTION OF THE DRAWINGS

An exemplary embodiment of the invention will now be described with reference to the drawing in which.

DETAILED DESCRIPTION OF A PREFERRED EMBODIMENT

Figure 1:
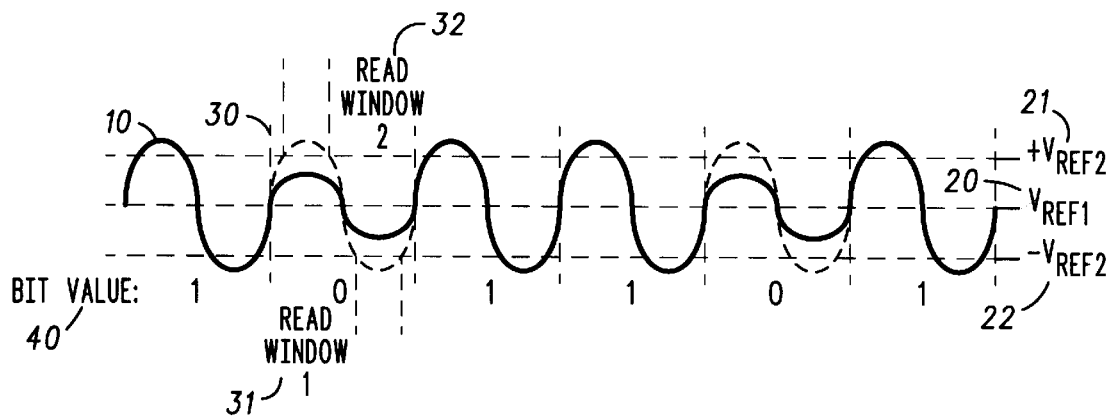
FIG. 1 shows a waveform exhibiting a bit-encoding method in accordance with the invention; and, FIG. 2 shows a portion of a distributed microcontroller system utilising the bit-encoding method of FIG. 1.

Referring to FIG. 1, there is shown a substantially sinusoidal waveform signal 10 which is the result of data modulation and which is used to carry data information on a communications bus (to be further described below). Each bit value 40 is determined by the amplitude of the signal as measured during a bit read 'window'. In a first read bit window 31 the amplitude of the signal 10 is compared to a positive threshold voltage level+Vref2 (reference number 21). In a second read bit window 32 the amplitude of the signal 10 is compared to a negative threshold voltage level−Vref2 (reference number 22).

In this example, if the amplitude of the signal is greater than +Vref2 (21) during the first bit read window 31 and less than −Vref2 (22) during the second bit read window 32, then the bit is given the logical value '1'. Alternatively, if the amplitude of the signal is less than +Vref2 (21) during the first bit read window 31 and greater than −Vref2 (22) during the second bit read window 32, then the bit is given the logical value '0'.

The start and end of each bit is defined as the point at which the signal 10 crosses a mid-point threshold level Vref1 20 with a positive going slope. This bit synchronisation timing point is shown on FIG. 1 by the line 30.

Figure 2:
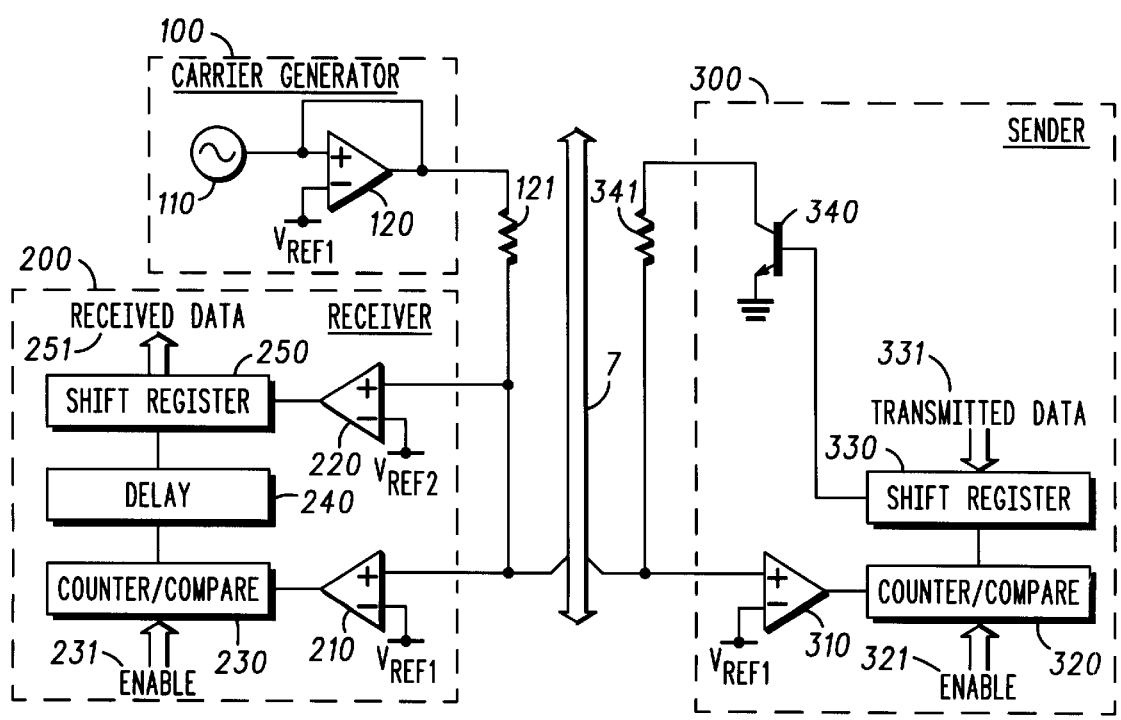

Referring to FIG. 2, there is shown a preferred embodiment of a system having a sender unit 300 and a receiver unit 200 arranged to communicate via a bus 7 using a protocol according to the data modulated signal 10 described above.

A carrier generator 100 is coupled to the bus via a resistor 121, and includes a sine wave generator 110 and an amplifier and level shifter stage 120. The sine wave generator 110 is coupled to provide a sine wave to the level shifter, which in turn provides a substantially uniform sine wave to the bus via the resistor 121.

The receiver 200 contains a first comparator 210 which is arranged to capture the bit synchronisation point 30 of the signal 10 and a second comparator 220 which is arranged to capture the amplitude of the signal 10 during the first bit read window 31. A further comparator may be used to capture the amplitude of the signal during the second bit read window, but for reasons of clarity, this is not shown.

The output of comparator 210 is connected to a counter/compare block 230 which can be enabled by an enable signal 231 from a controller (not shown) which is arranged to control the network communications. If the reception is enabled, the bit synchronisation signal from comparator 210 is passed through a delay block 240 to the clock of a shift register 250 such that the clock signal arrives during first bit read window. The data input of the shift register 250 comes from the comparator 220 which will be either a logic '1' or '0' depending on the amplitude of the signal 10. The received data 251 is connected to the communications controller, for providing the data thereto.

The sender 300 contains a comparator 310 which captures the bit synchronisation point 30 of the signal 10. The output of comparator 310 is connected to a counter/compare block 320 which can be enabled by an enable signal 321 from a controller (not shown) which controls the network communications of the sender 300. If transmission is enabled, the bit synchronisation signal from comparator 310 is passed directly to the clock input of the shift register 330. The input to the shift register 330 comes from the communications controller (not shown).

The output of the shift register 330 is connected to the switch 340. The logic level of the shift register 330 output opens or closes the switch 340. If the switch 340 is open, the carrier signal will be in substantially the same form as generated by the carrier generator 100. This leads to the signal 10 having an amplitude of greater than +Vref2 for the positive portion of the signal 10, and less than −Vref2 for the negative portion of the signal 10 (equivalent to logic '1'). If the switch 340 is closed, the carrier signal will be attenuated by the series impedance 341, which is given an arbitrary value of twice the value of the resistor 121 in series with the carrier generator. This attenuation leads to the signal 10 being amplitude modulated to an amplitude of less than +Vref2 for the positive portion of the signal 10, and greater than −Vref2 for the negative portion of the signal 10 (equivalent to logic '0').

In this way the above method proposes use of a sine wave carrier signal on a bus with the amplitude of the sine wave determining if that bit is a logic high '1' or a logic low '0'. The carrier signal will have substantially zero EMI emissions and the zero crossover points can be used to synchronise every bit of data in the message between the transmitter and receivers on the bus 7. It is perfectly possible to use both cycles of the sine wave to transmit data and utilise all available bandwidth.

Additionally, use of a sine wave carrier with a fixed frequency simplifies the implementation of a filter to actually prevent external noise affecting bus synchronisation.

In systems which employ Time Domain Multiple Access schemes in their serial communication protocols, using this method removes the requirement for complex and expensive clock synchronisation between the individual nodes. It will now be necessary for a node simply to count the zero crossover points on the bus until the count reaches the slot in the communications cycle which is allocated to that node. At that point, a gate will be opened allowing the node to transmit data onto the bus. All nodes are counting the same zero crossover points and are thus perfectly synchronised to each other. When the communication round reaches its end all nodes reset their counters to zero and the next round can begin.

It will be appreciated that alternative embodiments to the one described above are possible. For example, the bit synchronisation timing point could be defined as the point where the Vref1 value is crossed with a negative going slope.

Furthermore, it may be advantageous in highly-dependable systems that have dual redundant buses to transmit sine waves on two parallel buses which are out of phase but which use the same respective bit synchronisation points and using only the positive or negative cycle of the sine waves. This would ensure that external interference at a critical moment i.e. the zero crossover point, does not disrupt synchronisation on both buses.

In a typical example of a two bus arrangement, the two parallel buses may have sine waves which are in antiphase (half wavelength out of phase). In this way the bit synchronisation points of the two antiphase waves will be a half wavelength apart.

What is claimed is:

1. A bit encoding system for use with a bus of a distributed microcontroller network, comprising means for providing a first substantially sinusoidal waveform which is amplitude modulated between first and second amplitudes to define first and second data values, and means for selectively switching between the first and second data values substantially at the occurrence of a predetermined periodic parameter for defining timing information for the bus.

2. The system of claim 1 wherein the predetermined periodic parameter is a zero crossing point of the first sinusoidal waveform.

3. The system of claim 2 wherein the predetermined periodic parameter is the negative to positive zero crossing point of the sinusoidal waveform.

4. A bit encoding system for use with a first and a second bus of a distributed microcontroller network, comprising means for providing a first substantially sinusoidal waveform which is amplitude modulated between first and second amplitudes to define first and second data values for the first bus, and which has a predetermined periodic parameter for defining timing information for the first bus, and means for providing a second substantially sinusoidal waveform for the second bus, the second waveform being amplitude modulated in antiphase to the fist waveform, and having a predetermined periodic parameter for defining timing information for the second bus.

5. The system of claim 4 wherein the predetermined periodic parameter of the second waveform is phase shifted by a half wavelength from the predetermined periodic parameter of the first waveform.

6. A method for bit encoding a bus of a distributed microcontroller network, the method comprising:
   amplitude modulating a first substantially sinusoidal waveform between first and second amplitudes to define first and second data values; and,
   selectively switching between the first and second data values substantially at the occurrence of a predetermined periodic parameter for defining timing information for the bus.

7. The method of claim 6 wherein the predetermined periodic parameter is a zero crossing point of the first sinusoidal waveform.

8. The method of claim 7 wherein the predetermined periodic parameter is the negative to positive zero crossing point of the sinusoidal waveform.

9. The method of claim 6 comprising provising a second substantially sinusoidal waveform for a second bus, the further waveform being amplitude modulated in antiphase to the first waveform, and having a predetermined periodic parameter for defining timing information for the second bus.

10. The method of claim 9 wherein the predetermined periodic parameter of the second waveform is phase shifted by a half wavelength from the predetermined periodic parameter of the first waveform.

* * * * *